US012202281B2

(12) United States Patent
Amano et al.

(10) Patent No.: US 12,202,281 B2
(45) **Date of Patent: *Jan. 21, 2025**

(54) RECORDING APPARATUS

(71) Applicant: SEIKO EPSON CORPORATION

(72) Inventors: Yusaku Amano, Matsumoto (JP); Takeshi Aoki, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 183 days.

This patent is subject to a terminal disclaimer.

(21) Appl. No.: 18/050,777

(22) Filed: Oct. 28, 2022

(65) Prior Publication Data

US 2023/0211619 A1 Jul. 6, 2023

(30) Foreign Application Priority Data

Oct. 29, 2021 (JP) ................................ 2021-177187
Sep. 15, 2022 (JP) ................................ 2022-146832

(51) Int. Cl.
*B41J 29/02* (2006.01)

(52) U.S. Cl.
CPC .................................... *B41J 29/02* (2013.01)

(58) Field of Classification Search
CPC ................................. B41J 29/02; B41J 29/13
USPC ........................................................... 347/44
See application file for complete search history.

(56) References Cited

U.S. PATENT DOCUMENTS 8,646,872 B2 2/2014 Jo
2003/0076399 A1* 4/2003 Matsuo .................... B41J 29/02 347/104
2004/0114024 A1* 6/2004 Bouverie .................. B41J 3/01 347/219
2021/0001651 A1 1/2021 Saiga

FOREIGN PATENT DOCUMENTS

JP 2000068657 A 3/2000

* cited by examiner

*Primary Examiner* — Jason S Uhlenhake
*Assistant Examiner* — Alexander D Shenderov
(74) *Attorney, Agent, or Firm* — CHIP LAW GROUP

(57) ABSTRACT

A recording apparatus includes a recording unit including a recorder configured to perform recording on a medium, and a first side plate and a second side plate being a pair of side plates positioned across the recording unit, and configured to support the recording unit. An apparatus gravity center position is on a side close to the second side plate with respect to an intermediate position between the first side plate and the second side plate, and the number of components, of the recording unit, supported by the first side plate is smaller than the number of components, of the recording unit, supported by the second side plate.

13 Claims, 10 Drawing Sheets

RECORDING APPARATUS

The present application is based on, and claims priority from JP Application Serial Number 2021-177187, filed Oct. 29, 2021 and JP Application Serial Number 2022-146832, filed Sep. 15, 2022, the disclosures of which are hereby incorporated by reference herein in their entirety.

BACKGROUND

1. Technical Field

The present disclosure relates to a recording apparatus that performs recording on a medium.

2. Related Art

In a printer being an example of the recording apparatus, when there are irregularities on a placement surface of the apparatus, a shape of a main body frame is deformed. With this, accuracy of positions of respective units mounted to the main body frame is degraded. In view of this problem, JP-A-2000-068657 discloses a printer that has a frame structure assembled separately from the main body frame and includes an imaging unit and a writing unit mounted to the frame structure. According to the printer, the imaging unit and the writing unit are provided to the frame structure that is assembled separately from the main body frame, and hence degradation of accuracy of the positions of the respective units, which is caused by distortion of the main body frame, can be suppressed.

According to the printer described in JP-A-2000-068657, distortion of the main body frame is less likely to affect the frame structure including the imaging unit and the writing unit. However, there is room for improvement with regard to the following matters.

First, the printer described in JP-A-2000-068657 has a configuration in which the frame structure including the imaging unit and the writing unit is placed on two upper stays constituting the main body frame. More specifically, the frame structure including the imaging unit and the writing unit is supported at two points for each upper stay, and hence is the frame structure supported at four points in total. Thus, when distortion of the main body frame is caused, a gap is formed between the frame structure and the upper stay at any one of the four supporting positions. With this, there may be a risk of distortion of the frame structure. However, the above-mentioned printer described in JP-A-2000-068657 does not take such a problem into consideration.

Next, in a case of the printer described in JP-A-2000-068657, the frame structure including the imaging unit and the writing unit is only placed on the main body frame. Thus, there may be a risk that a position of the frame structure with respect to the main body frame is largely shifted. Therefore, when a sheet transport path is provided to the main body frame, it is preferred that the frame structure including the imaging unit and the writing unit be fixed to the main body frame for the purpose of preventing position shift between the sheet transport path and the main body frame. However, when the frame structure including the imaging unit and the writing unit is fixed to the main body frame, distortion of the main body frame strongly affects the frame structure. Thus, the frame structure is distorted.

Here, it has been understood that distortion of the main body frame has a specific tendency depending on the gravity center position of the apparatus. Specifically, for example, in a case in which the gravity center position of the apparatus is close to the back surface of the apparatus, when a protruding portion is on the placement surface of the apparatus, the front surface of the apparatus tends to have a floating position regardless of a position of the apparatus with respect to the protruding portion. There is no support from the placement surface at the position floating from the placement surface of the apparatus main body, and hence the main body frame is distorted. When the gravity center position of the apparatus is not at the center and is deviated in a predetermined direction as described above, the frame on a side opposite thereto is likely to be distorted.

Thus, it is preferred that the above-mentioned technical problem of the printer described in JP-A-2000-068657 be solved in view of the gravity center position of the apparatus.

SUMMARY

In order to solve the above-mentioned problem, a recording apparatus according to the present disclosure includes a recording unit including a recorder configured to perform recording on a medium, and a first side plate and a second side plate being a pair of side plates positioned across the recording unit and being configured to support the recording unit, wherein an apparatus gravity center position is on a side close to the second side plate with respect to an intermediate position between the first side plate and the second side plate, and the number of components of the recording unit that are supported by the first side plate is smaller than the number of components thereof that are supported by the second side plate.

The recording apparatus according to the present disclosure includes a recording unit including a recorder configured to perform recording on a medium, and a first side plate and a second side plate being a pair of side plates positioned across the recording unit and being configured to support the recording unit, wherein an apparatus gravity center position is on a side close to the second side plate with respect to an intermediate position between the first side plate and the second side plate, and the recording unit is coupled to the first side plate with play.

DESCRIPTION OF EXEMPLARY EMBODIMENTS

Figure 1:
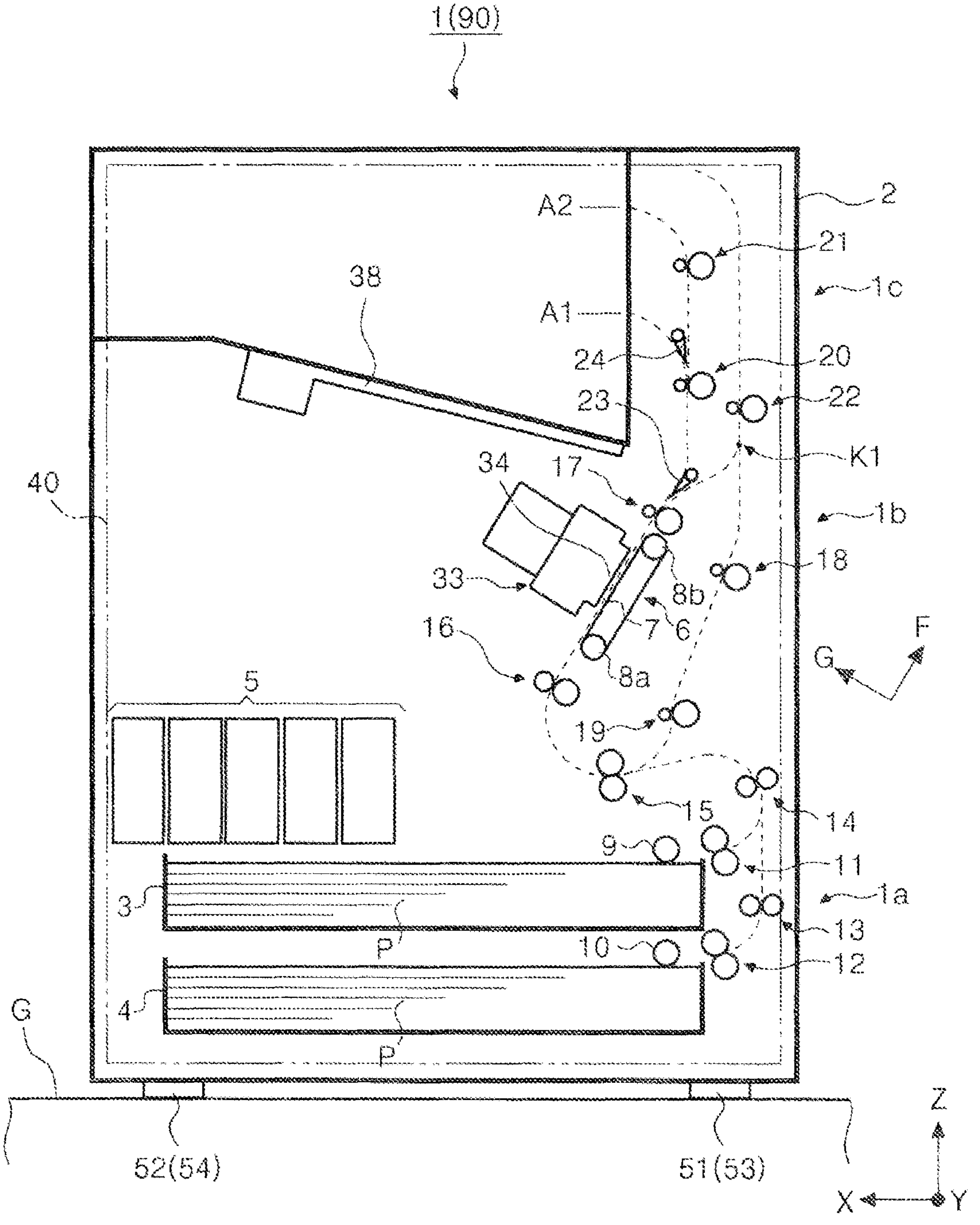
FIG. 1 is a view illustrating a medium transport path in a printer.

The present disclosure is described below in schematic matter.

A recording apparatus according to a first aspect includes a recording unit including a recorder configured to perform recording on a medium, and a first side plate and a second side plate being a pair of side plates positioned across the recording unit, and configured to support the recording unit, wherein an apparatus gravity center position is on a side close to the second side plate with respect to an intermediate position between the first side plate and the second side plate, and the number of components, of the recording unit, supported by the first side plate is smaller than the number of components, of the recording unit, supported by the second side plate.

According to this aspect, the apparatus gravity center position is on the side close to the second side plate with respect to the intermediate position between the first side plate and the second side plate. With this, when a protruding portion is present on the placement surface of the apparatus, distortion of the first side plate is likely to occur. Further, the number of components of the recording unit that are supported by the first side plate is smaller than the number of components thereof that are supported by the second side plate. Thus, distortion of the first side plate is less likely to affect the recording unit. With this, even when the first side plate is distorted, distortion of the recording unit can be suppressed, and hence degradation of recording quality can be suppressed.

According to the first aspect, in a second aspect, the recording unit is coupled to the first side plate with play.

According to this aspect, the recording unit is coupled to the first side plate with play. Thus, while defining the position of the recording unit with respect to the pair of side plates, distortion of the first side plate can be prevented from affecting the recording unit.

A recording apparatus according to a third aspect includes a recording unit including a recorder configured to perform recording on a medium, and a first side plate and a second side plate being a pair of side plates positioned across the recording unit and being configured to support the recording unit, wherein an apparatus gravity center position is on a side close to the second side plate with respect to an intermediate position between the first side plate and the second side plate, and the recording unit is coupled to the first side plate with play.

According to this aspect, the apparatus gravity center position is on the side close to the second side plate with respect to the intermediate position between the first side plate and the second side plate. With this, when a protruding portion is present on the placement surface of the apparatus, distortion of the first side plate is likely to occur. The recording unit is coupled to the first side plate with play. Thus, while defining the position of the recording unit with respect to the pair of side plates, distortion of the first side plate can be prevented from affecting the recording unit. Moreover, degradation of recording quality can be suppressed.

According to the second aspect or the third aspect, in a fourth aspect, the play is play in a direction in which the first side plate is at least away from the second side plate.

According to this aspect, the play is play in the direction in which the first side plate is at least away from the second side plate. Thus, distortion of the first side plate in the direction in which the first side plate is away from the second side plate is less likely to affect the recording unit.

According to the fourth aspect, in a fifth aspect, the recording unit is coupled to the first side plate by a stepped screw, the stepped screw includes a head portion, a screw portion fitted in a screw hole in the recording unit, and a cylinder portion having a diameter larger than the screw portion and being provided between the head portion and the screw portion, and the cylinder portion is inserted into a through hole formed in the first side plate.

According to this aspect, the stepped screw is used. With this, the play can be secured, and the first side plate and the recording unit can easily be coupled to each other.

According to any one of the first aspect to the fifth aspect, in a sixth aspect, the recording unit is supported at one position being a first supported portion at the first side plate, and is supported at two positions being a second supported portion and a third supported portion at the second side plate.

According to this aspect, the recording unit is supported at one position being the first supported portion at the first side plate, and is supported at two positions being the second supported portion and the third supported portion at the second side plate. Thus, while the second side plate securely supports the recording unit, the distortion of first side plate can be prevented from affecting the recording unit more securely.

According to the sixth aspect, in a seventh aspect, the recording unit includes a transport belt being arranged at a position facing the recorder and being configured to transport the medium, the transport belt is stretched around a first pulley and a second pulley that are arranged along a transport direction of the medium, and the second supported portion and the third supported portion are on an extension line of a linear line coupling a rotation center of the first pulley and a rotation center of the second pulley to each other, and sandwich the transport belt when a transport path of the medium is viewed from a side.

Even when the second side plate is distorted, this distortion has an influence that distorts the recording unit via the second supported portion and the third supported portion. In this case, when the recording unit is at a position farther away from the second supported portion and the third supported portion, distortion of the recording unit is likely to be increased. Thus, there may be a risk that, as the transport belt is at a position farther away from the second supported portion and the third supported portion, position shift of the transport belt along with distortion of the recording unit is increased more.

According to this aspect, the second supported portion and the third supported portion are on the extension line of the linear line coupling the rotation center of the first pulley and the rotation center of the second pulley to each other, and sandwich the transport belt when the transport path of the medium is viewed from a side. Thus, position shift of the transport belt along with distortion of the recording unit can be suppressed. Moreover, position shift of the transport belt from the pair of side plates can be suppressed. With this, for example, when a transport mechanism of the medium is provided to the pair of side plates, position shift between the transport mechanism and the transport belt can be suppressed, and the medium can be transported appropriately.

According to the seventh aspect, in an eighth aspect, the first supported portion is at a position overlapping with the second supported portion or the third supported portion as viewed in a direction intersecting the pair of side plates.

According to this aspect, the first supported portion is at the position overlapping with the second supported portion or the third supported portion as viewed in the direction intersecting the pair of side plates. Thus, when the first supported portion is at a position overlapping with the second supported portion, for example, the recording unit has a structure in which the third supported portion receives rotational moment having the first supported portion and the second supported portion as a rotation center. With this, complex distortion of the recording unit, which is caused by an own weight of the recording unit, can be suppressed.

According to any one of the sixth aspect to the eighth aspect, in a ninth aspect, at least one of the first supported portion, the second supported portion, and the third supported portion overlaps with a vertical line passing through the gravity center position of the recording unit as viewed in the direction intersecting the pair of side plates.

According to this aspect, at least one of the first supported portion, the second supported portion, and the third supported portion overlaps with the vertical line passing through the gravity center position of the recording unit as viewed in the direction intersecting the pair of side plates. Thus, an own weight of the recording unit acts linearly along the vertical line on at least one of the first supported portion, the second supported portion, and the third supported portion. With this, deformation of the recording unit due to an own weight of the recording unit can be suppressed.

According to any one of the sixth aspect to the eighth aspect, in a tenth aspect, the recorder is displaceable between a first position and a second position in the recording unit, and at least one of the first supported portion, the second supported portion, and the third supported portion is positioned between a first vertical line and a second vertical line, or overlaps with at least one of the first vertical line and the second vertical line as viewed in a direction intersecting the pair of side plates, the first vertical line passing through the gravity center position of the recording unit when the recorder is at the first position, the second vertical line passing through the gravity center position of the recording unit when the recorder is at the second position.

According to this aspect, at least one of the first supported portion, the second supported portion, and the third supported portion is positioned between the first vertical line and the second vertical line, or overlaps with at least one of the first vertical line and the second vertical line. Thus, an own weight of the recording unit acts linearly along the vertical line on at least one of the first supported portion, the second supported portion, and the third supported portion. Alternatively, an own weight of the recording unit acts linearly along the vertical line on the vicinity of at least one of the first supported portion, the second supported portion, and the third supported portion. With this, deformation of the recording unit due to an own weight of the recording unit can be suppressed.

According to any one of the sixth aspect to the tenth aspect, in an eleventh aspect, the recording unit includes a first sub frame being a frame facing the first side plate and including the first supported portion, and a second sub frame being a frame facing the second side plate and including the second supported portion and the third supported portion.

According to this aspect, the recording unit includes the first sub frame being a frame facing the first side plate and including the first supported portion, and the second sub frame being a frame facing the second side plate and including the second supported portion and the third supported portion. In this configuration, the actions and effects of any one of the sixth aspect to the tenth aspect described above can be obtained.

According to the eleventh aspect, in a twelfth aspect, the recorder includes a liquid ejection head configured to eject a liquid, and the recording unit includes, between the first sub frame and the second sub frame, a wiping unit configured to perform wiping on a liquid ejection surface of the liquid ejection head and a cap unit configured to cap the liquid ejection surface.

According to this aspect, the recording unit includes, between the first sub frame and the second sub frame, the wiping unit that performs wiping on the liquid ejection surface of the liquid ejection head, and the cap unit that caps the liquid ejection surface. Thus, influence of distortion of the pair of side plates, which affects a positional relationship between the recorder and the wiping unit or a positional relationship between the recorder and the cap unit, can be suppressed. As a result, the wiping unit can perform wiping on the liquid ejection surface appropriately. Further, the cap unit can cap the liquid ejection surface appropriately.

According to any one of the first aspect to the twelfth aspect, in a thirteenth aspect, a leg portion is provided at each of four corners of a bottom portion of an apparatus main body.

According to this aspect, in the configuration in which the leg portion is provided at each of the four corners of the bottom portion of the apparatus body, the actions and effects in any one of the first aspect to the twelfth aspect can be obtained.

The present disclosure is described below in detail.

An ink-jet printer 1 performs recording by ejecting a liquid, which is representatively exemplified by ink, onto a medium, which is representatively exemplified by recording paper. Such a printer is described below as an example of the recording apparatus. In the following description, the ink-jet printer 1 is referred to as a printer 1 in an abbreviated manner.

An X-Y-Z coordinate system illustrated in each of the drawings is an orthogonal coordinate system. A Y-axis direction corresponds to a width direction intersecting the transport direction of the medium, and also corresponds to the apparatus depth direction. A +Y direction being a direction in which the arrow is oriented in the Y-axis direction corresponds to a direction from an apparatus front surface to an apparatus back surface, and a −Y direction opposite to the +Y direction corresponds to a direction from the apparatus back surface to the apparatus front surface.

An X-axis direction corresponds to the width direction of the apparatus. A +X direction being a direction in which the arrow is oriented as viewed from an operator of the printer 1 corresponds to a left side, and a −X direction opposite thereto corresponds to a right side. The Z-axis direction corresponds to a vertical direction, that is, the height direction of the apparatus. A +Z direction being a direction in which the arrow is oriented corresponds to an upper direction, and a −Z direction opposite thereto corresponds to a lower direction. In the following description, the term "up" in indicates the +Z direction, and the term "down" indicates the −Z direction.

A G-axis direction corresponds to a normal line direction of a line head 34, which is described later, with respect to an ink ejection surface 35. A +G direction being a direction in which the arrow is oriented corresponds to a direction in which a head unit 33 is away from a transport belt 7, and a −G direction opposite thereto is a direction in which the head unit 33 approaches the transport belt 7.

An F-axis direction corresponds to a direction parallel to the ink ejection surface 35. A +F direction being the medium transport direction at a position facing the ink ejection surface 35 and a direction in which the arrow is oriented corresponds to downstream in the transport direction, and a −F direction opposite thereto corresponds to upstream in the transport direction. Note that, in the following description, a side to which the medium is fed is referred to as "downstream", and a side opposite thereto is referred to as "upstream" in some cases. The F-axis direction is a moving direction of a cap carriage 31 described later.

In some of the drawings, an F-G-Y coordinate system is used in place of the X-Y-Z coordinate system.

In FIG. 1, a medium transport path is indicated with the broken line. In the printer 1, the medium is transported in the medium transport path indicated with the broken line.

An apparatus main body 2 of the printer 1 includes a first medium cassette 3 and a second medium cassette 4 that accommodate the medium before feeding. The reference symbol P indicates the medium accommodated in each medium cassette. The first medium cassette 3 and the second medium cassette 4 are provided to the apparatus main body 2 so as to be removed from the apparatus front side.

The first medium cassette 3 is provided with a pick roller 9 that feeds out the accommodated medium, and the second medium cassette 4 is provided with a pick roller 10 that feeds out the accommodated medium.

The first medium cassette 3 is provided with a feeding roller pair 11 that feeds the fed-out medium obliquely upward. The second medium cassette 4 is provided with a feeding roller pair 12 that feeds the fed-out medium obliquely upward and a transport roller pair 13 that transports the medium upward.

Note that, in the following description, the term "roller pair" includes a driving roller driven by a motor, which is not illustrated, and a driven roller to rotate in contact with the driving roller, unless otherwise noted.

The medium fed out from each of the medium cassettes is fed by a transport roller pair 14 and a transport roller pair 15 to a transport roller pair 16. The medium that receives a feeding force from the transport roller pair 16 is fed to a position between the line head 34 and the transport belt 7, that is, a position facing the line head 34.

The line head 34 performs recording by ejecting an ink onto a surface of the medium. The line head 34 is an ink ejection head configured so that nozzles (not illustrated) for ejecting an ink cover the entire medium in the width direction, and is configured as an ink ejection head capable of performing recording on the entire medium in the width direction without moving in the medium width direction. The line head 34 is an example of the liquid ejection head that ejects a liquid.

The reference symbol 5 indicates an ink storage that accommodates ink. The ink ejected from the line head 34 is supplied from the ink storage 5 to the line head 34 via tube omitted in illustration. The ink storage 5 includes a plurality of ink tanks that are arranged along the X-axis direction.

The transport belt 7, and pulleys **8*a* and 8*b* constitute a transport unit 6. The transport belt 7 is an endless belt that is stretched around the pulley 8*a* and the pulley 8*b* that are arranged along the medium transport direction. The transport belt 7 rotates when at least one of the pulley 8*a* and the pulley 8*b* is driven by a motor, which is not illustrated. The pulley 8*a* is an example of the first pulley, and the pulley 8*b*** is an example of the second pulley.

The medium is transported is sucked on a belt surface of the transport belt 7, and is transported along the position facing the line head 34. For suction of the medium on the transport belt 7, a publicly-known suction method such as an air suction method and an electrostatic suction method may be adopted.

Here, the medium transport path passing through the position facing the line head 34 intersects both the horizontal direction and the vertical direction, and has a configuration in which the medium is transported obliquely upward. The obliquely upward transport direction is a direction including a −X direction component and a +Z direction component in FIG. 1. With this configuration, the dimension of the printer 1 in the horizontal direction can be suppressed.

Note that, in the present exemplary embodiment, the medium transport path passing through the position facing the line head 34 is set to have an inclination angle falling within the range from 50 degrees to 70 degrees with respect to the horizontal direction. More specifically, the inclination angle is set to 60 degrees.

The medium having a first surface subjected to recording by the line head 34 is further fed obliquely upward by a transport roller pair 17 positioned downstream of the transport belt 7.

A flap 23 is provided downstream of the transport roller pair 17, and the flap 23 switches the transport direction of the medium. When the medium is directly discharged, the flap 23 switches the transport path of the medium toward a transport roller pair 20 provided above. A flap 24 is further provided upstream of the transport roller pair 20. The flap 24 switches the transport path to either of discharge from a discharge position A1 or transport to a transport roller pair 21 positioned further vertically upward. When the medium is fed toward the transport roller pair 21, the medium is discharged from a discharge position A2.

The medium discharged from the discharge position A1 is received on a discharge tray 38 that is inclined obliquely upward in a direction including a +X direction component and a +Z direction component. The medium discharged from the discharge position A2 is received on an optional tray, which is not illustrated.

When recording is further performed on a second surface in addition to the first surface of the medium, the medium is fed by the flap 23 obliquely upward in a direction including a −X direction component and a +Z direction component, passes through a branching position K1, and is fed from the branching position K1 to a switch-back path above. The switch-back path is provided with transport roller pair 22. The medium that reaches the switch-back path is transported upward by the transport roller pair 22. Further, when the trailing edge of the medium passes through the branching position K1, rotation direction of the transport roller pair 22 is switched. With this, the medium is transported downward.

The medium that is transported downward by the transport roller pair 22 receives a feeding force from a transport roller pair 18, a transport roller pair 19, and the transport roller pair 15 to arrive at the transport roller pair 16, and then is fed again to the position facing the line head 34 by the transport roller pair 16.

When the medium that is fed again to the position facing the line head 34, the second surface opposite to the first surface on which recording is already performed faces the line head 34. With this, the line head 34 is capable of performing recording on the second surface of the medium. The medium having the second surface after recording is discharged from the discharge position A1 or the discharge position A2 that are described above.

Next, a motion unit 25 is described. The motion unit 25 is an example of the recording unit. The motion unit 25 illustrated in FIG. 5 includes the head unit 33, the cap carriage 31, and a wiper carriage 36 that are illustrated in FIG. 2.

Figure 2:
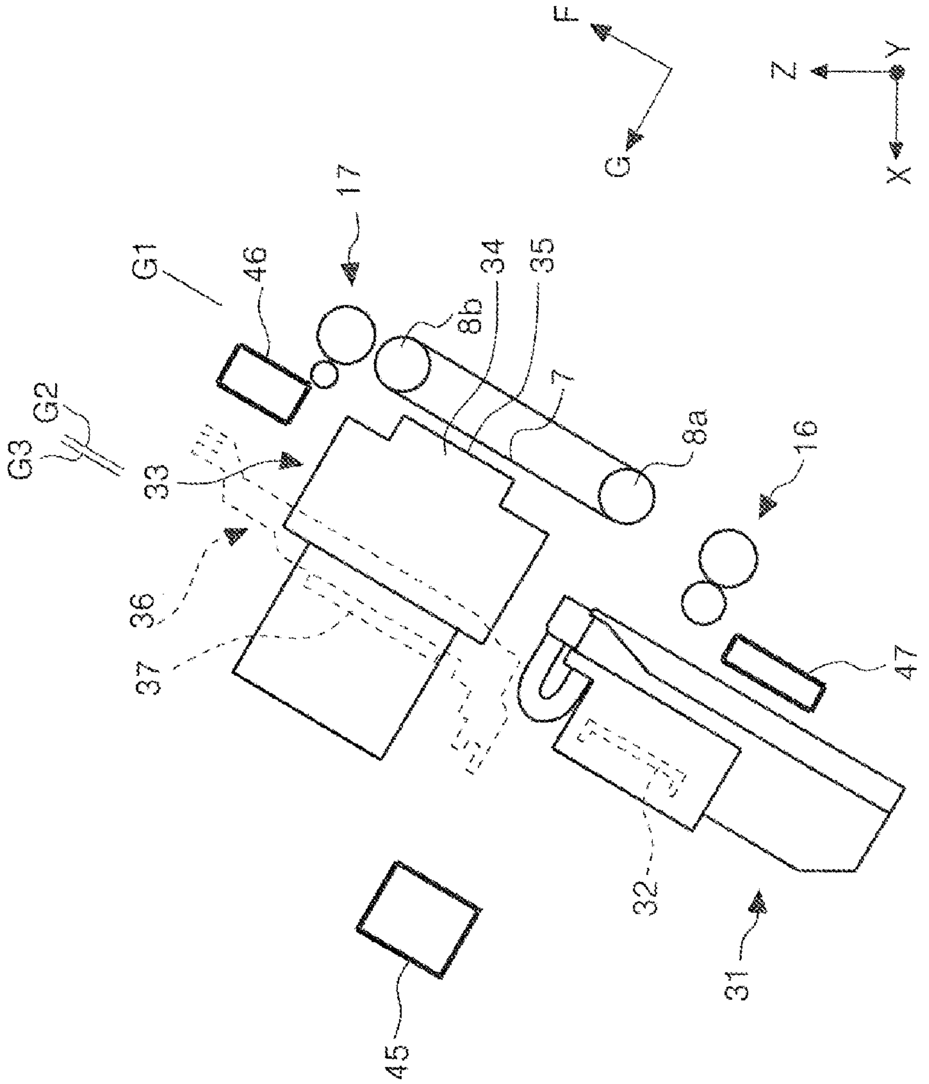
FIG. 2 is a view illustrating a positional relationship of a head unit, a cap carriage, and a wiper carriage.

In FIG. 2, the head unit 33 is a unit including the line head 34, and is provided so as to be driven by a motor, which is not illustrated, along the G-axis direction. The head unit 33 is an example of the recorder.

In FIG. 2, the cap carriage 31 is an example of the cap unit including the cap 32 for covering the line head 34, and is provided so as to be driven by a motor, which is not illustrated, along the F-axis direction.

The wiper carriage 36 is an example of the wiper unit provided with a wiper 37 for performing wiping on the ink ejection surface 35 of the line head 34, and is provided so as to be driven by a motor, which is not illustrated, along the Y-axis direction.

In this manner, the head unit 33, the cap carriage 31, and the wiper carriage 36 are provided in the motion unit 25 in directions orthogonal to one another so as to be driven.

FIG. 2 illustrates positions of the respective units when the line head 34 performs recording on the medium. A position G1 is a position of the ink ejection surface 35 in the G-axis direction in this state. In this state, the cap carriage 31 is at a retracting position in the −F direction with respect to the head unit 33, and the wiper carriage 36 is at a home position set in the +Y direction.

When the ink ejection surface 35 is capped with the cap 32 included in the cap carriage 31 from this state, the head unit 33 retracts in the +G direction from the position in FIG. 2, and the cap carriage 31 moves in the +F direction. With this, the ink ejection surface 35 and the cap 32 face each other. When the ink ejection surface 35 and the cap 32 face each other, the head unit 33 moves in the −G direction. With this, the ink ejection surface 35 is capped with the cap 32. A position G2 is a position of the ink ejection surface 35 in the G-axis direction when the ink ejection surface 35 is capped with the cap 32.

When the wiper 37 included in the wiper carriage 36 performs wiping on the ink ejection surface 35, the head unit 33 retracts in the +G direction from the state in FIG. 2. Then, the wiper carriage 36 moves from the home position in the +Y direction to an end position in the −Y direction. After that, the head unit 33 slightly moves in the −G direction, and the wiper carriage 36 moves in the +Y direction while the ink ejection surface 35 is at a position G3. With this, the wiper 37 performs wiping on the ink ejection surface 35.

The position of the head unit 33 when the ink ejection surface 35 is at the position G1 is an example of the first position of the head unit 33. Further, the position of the head unit 33 when the ink ejection surface 35 is at the position G3 is an example of the second position of the head unit 33.

Figure 3:
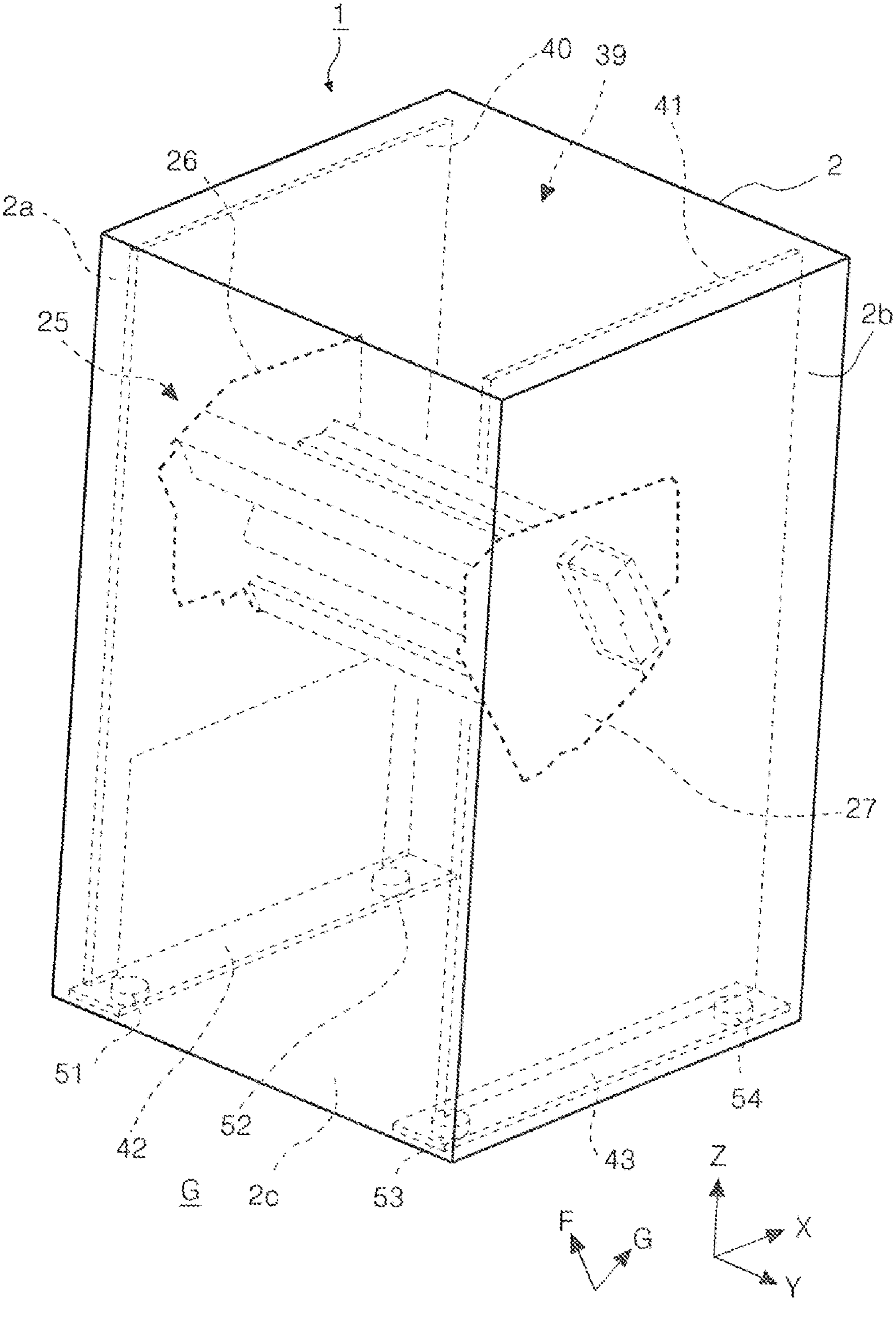
FIG. 3 is a view schematically illustrating a relationship between a frame structure body and a motion unit.
Figure 4:
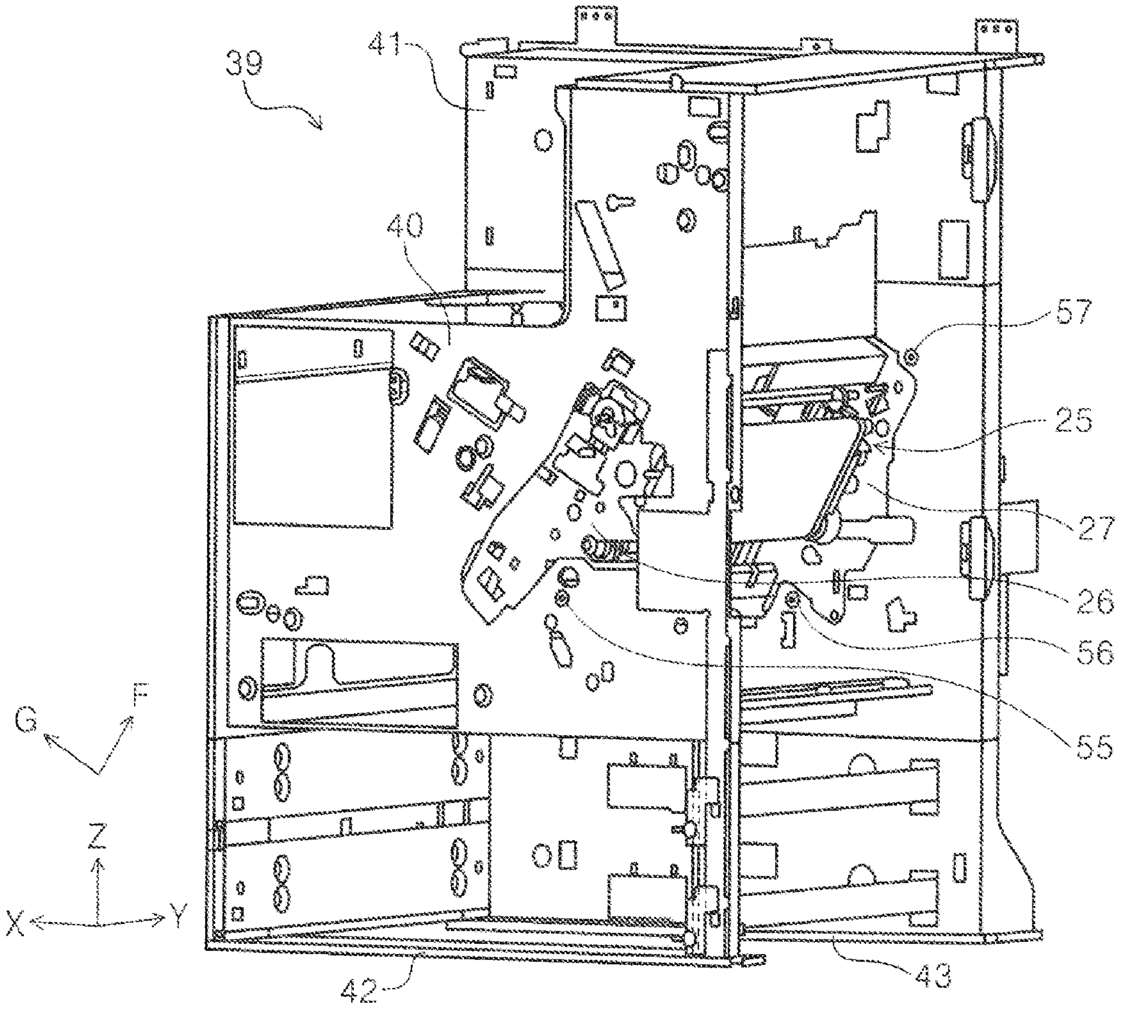
FIG. 4 is a perspective view of the frame structure body.
Figure 5:
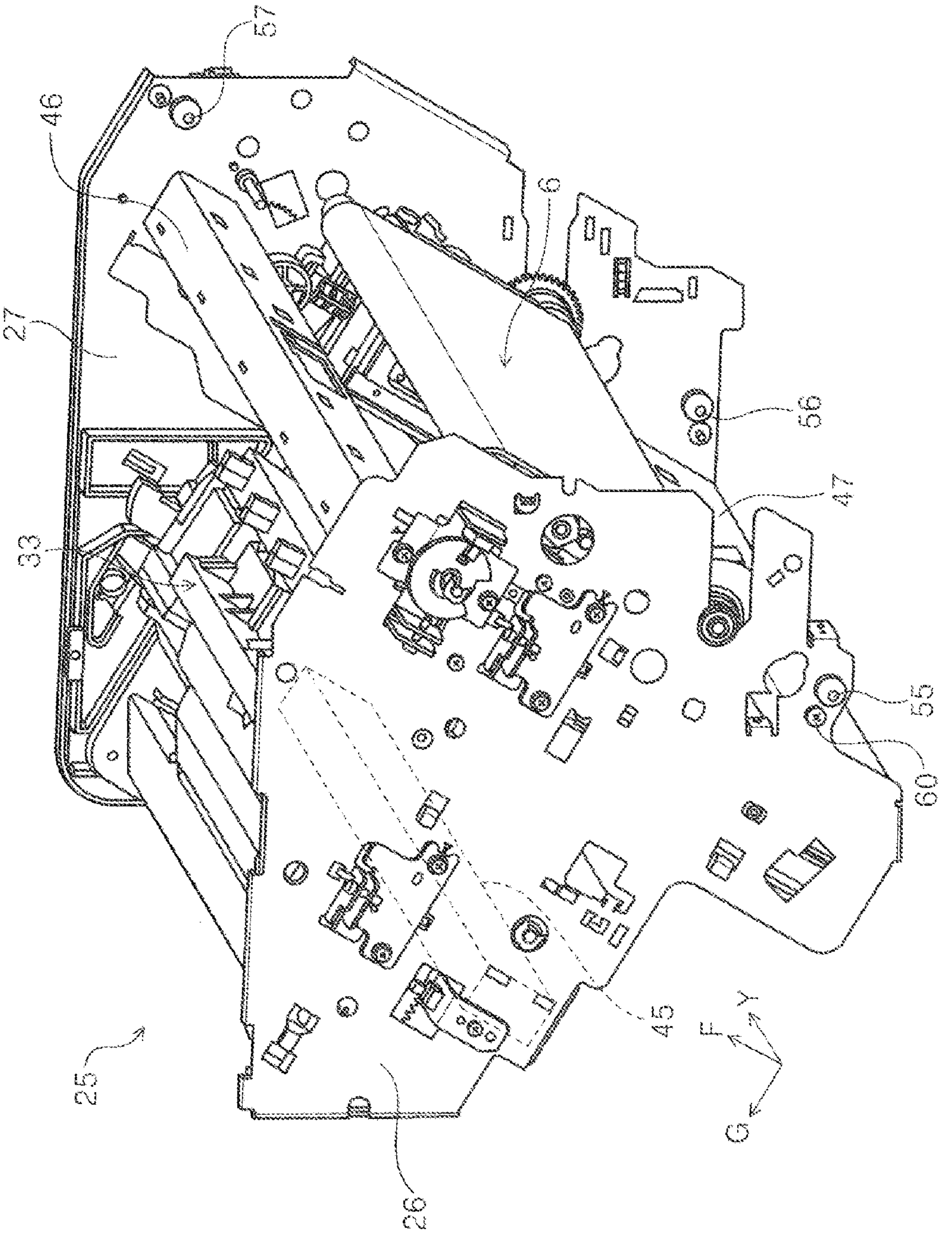
FIG. 5 is a perspective view of the motion unit.

Subsequently, as illustrated in FIG. 3, FIG. 4, and FIG. 5, the motion unit 25 includes a first sub frame 26 and a second sub frame 27 that is positioned in the +Y direction with respect to the first sub frame 26. Each of the first sub frame 26 and the second sub frame 27 is formed of a metal plate material, and forms a frame surface along an F-G plane.

As illustrated in FIG. 5, the first sub frame 26 and the second sub frame 27 are coupled to each other with a first coupling frame 45, a second coupling frame 46, and a third coupling frame 47 that extend in the Y-axis direction. Each of the first coupling frame 45, the second coupling frame 46, and the third coupling frame 47 is formed by subjecting a metal plate material to bending processing.

In the present exemplary embodiment, the first coupling frame 45, the second coupling frame 46, and the third coupling frame 47 are joined to the first sub frame 26 and the second sub frame 27 by welding. With this, rigidity of the entire motion unit 25 is secured.

Each of the first coupling frame 45, the second coupling frame 46, and the third coupling frame 47 is obtained by bending processing so that a part or an entirety of a cross-section thereof, which is taken along the F-G plane, is square (see FIG. 2). With this, rigidity of the motion unit 25 is further improved.

As illustrated in FIG. 3, the apparatus main body 2 includes a front frame 40 at the end in the −Y direction, and includes a rear frame 41 at the end in the +Y direction. The front frame 40 and the rear frame 41 are collectively an example of the pair of side plates positioned across the motion unit 25. The front frame 40 is an example of the first side plate, and the rear frame 41 is an example of the second side plate.

The front frame 40 stands upright on a first bottom frame 42, and the rear frame 41 stands upright on a second bottom frame 43. Each of the front frame 40, the rear frame 41, the first bottom frame 42, and the second bottom frame 43 is formed of a metal material.

The motion unit 25 is supported by the front frame 40 and the rear frame 41. The front frame 40, the rear frame 41, the first bottom frame 42, the second bottom frame 43, and the motion unit 25 constitute a frame structure body 39 being a base body of the apparatus main body 2. Note that, as illustrated in FIG. 4, the frame structure body 39 includes a plurality of coupling frames in addition to the front frame 40, the rear frame 41, the first bottom frame 42, the second bottom frame 43, and the motion unit 25. However, description for the plurality of coupling frames is omitted below.

The exterior of the frame structure body 39 is a casing body formed of a resin material. However, description therefor is also omitted. The frame structure body 39 formed of a metal material and the casing body formed of a resin material constitute the apparatus main body 2.

The front frame 40 forms a frame surface parallel to an X-Z plane so as to extend along a front surface 2*a* of the apparatus main body 2. The rear frame 41 forms a frame surface parallel to the X-Z plane so as to extend along a back surface 2*b* of the apparatus main body 2. The first bottom frame 42 and the second bottom frame 43 form a frame surface parallel to an X-Y plane so as to extend along a bottom surface 2*c* of the apparatus main body 2.

The first bottom frame 42 is provided with a front right leg portion 51 and a front left leg portion 52, and the second bottom frame 43 is provided with a rear right leg portion 53 and a rear left leg portion 54. In other words, the leg portions are provided at the four corners of the apparatus main body 2, respectively. The apparatus main body 2 is placed on a placement surface G via the four leg portions including the front right leg portion 51, the front left leg portion 52, the rear right leg portion 53, and the rear left leg portion 54. Note that, in the following description, when there is no particular need to distinguish the front right leg portion 51, the front left leg portion 52, the rear right leg portion 53, and the rear left leg portion 54 from one another, those portions are simply referred to as a “leg portion” in some cases.

Next, a gravity center position of the apparatus main body 2 is described. Further, along with this, description is made on distortion of the frame when any one of the four leg portions stands on a protruding portion (not illustrated) on the placement surface G.

FIGS. 6A-6D are plan views of the bottom surface 2*c* as the apparatus main body 2 is viewed from below. In FIGS. 6A-6D, a linear line CLx is a linear line parallel to the Y axis, and is a linear line passing through the center position of the apparatus main body 2 in the X-axis direction. Further, a linear line CLy is a linear line parallel to the X axis, and is a linear line passing through the center position of the apparatus main body 2 in the Y-axis direction. Note that the center position of the apparatus main body 2 in the Y-axis direction is also an intermediate position of the front frame 40 and the rear frame 41 in the Y-axis direction.

The reference symbol M indicates a gravity center position of the apparatus main body 2. As illustrated, the gravity center position M of the apparatus main body 2 is on the rear side (in the +Y direction with respect to the linear line CLy) in the apparatus front-rear direction (in the Y-axis direction), in other words, on a side close to the rear frame 41. Further, the gravity center position M is on the right side (in the −X direction with respect to the linear line CLx) in the apparatus right-left direction (in the X-axis direction).

Note that, in the present exemplary embodiment, the gravity center position M of the apparatus main body 2 is remained at substantially the same position regardless of an ink remaining amount in the ink storage 5 (see FIG. 1).

With this configuration as described above, in a case in which the protruding portion caused by a bump, a foreign matter, or the like is on the placement surface G (see FIG. 1 and FIG. 3), when any one of the four leg portions stands on the protruding portion, the frame structure body 39 is distorted.

Details are further described below. The leg portion indicated with the outlined arrow in FIGS. 6A-6D is a leg portion that stands on the protruding portion of the placement surface G. The painted leg portion is a leg portion in contact with the placement surface G. The outlined leg portion is a leg portion that floats from the placement surface G.

Figure 6B:
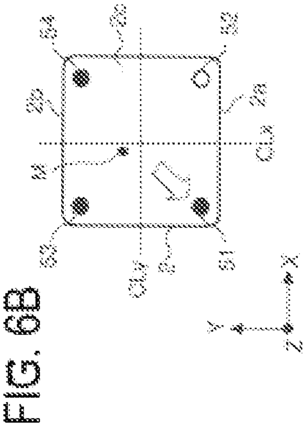
FIGS. 6A-6D are views schematically illustrating a relationship between a position of a protruding portion on a placement surface with respect to a leg portion and a floating position of the leg portion.
Figure 6D:
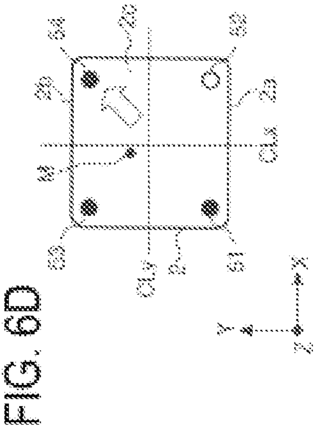
Figure 6A:
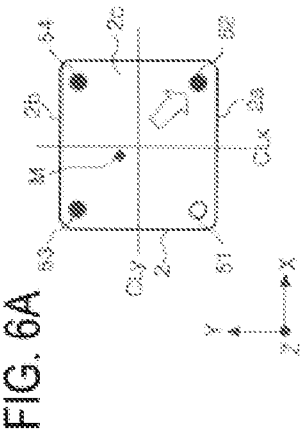

For example, FIG. 6A illustrates a case in which the front left leg portion 52 stands on the protruding portion of the placement surface G. In this case, the gravity center of the apparatus main body 2 is on the rear side, and hence the apparatus main body 2 in inclined to the rear side (in the +Y direction). As a result, the front left leg portion 52, the rear right leg portion 53, and the rear left leg portion 54 are held in contact with the placement surface G, and the front right leg portion 51 floats from the placement surface G.

FIG. 6B illustrates a case in which the front right leg portion 51 stands on the protruding portion of the placement surface G. In this case, the gravity center of the apparatus main body 2 is on the rear side, and hence the apparatus main body 2 in inclined to the rear side (in the +Y direction). As a result, the front right leg portion 51, the rear right leg portion 53, and the rear left leg portion 54 are held in contact with the placement surface G, and the front left leg portion 52 floats from the placement surface G.

Figure 6C:
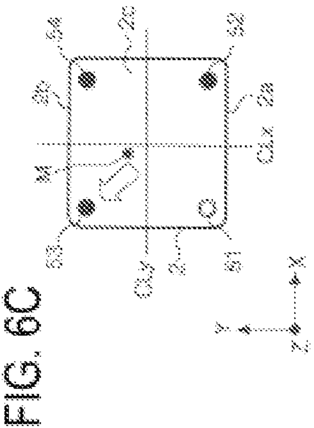

FIG. 6C illustrates a case in which the rear right leg portion 53 stands on the protruding portion of the placement surface G. In this case, the apparatus main body 2 is inclined to the left side (in the +X direction). As a result, the front left leg portion 52, the rear right leg portion 53, and the rear left leg portion 54 are held in contact with the placement surface G, and the front right leg portion 51 floats from the placement surface G.

FIG. 6D illustrates a case in which the rear left leg portion 54 stands on the protruding portion of the placement surface G. In this case, the apparatus main body 2 is inclined to the right side (in the −X direction). As a result, the front right leg portion 51, the rear right leg portion 53, and the rear left leg portion 54 are held in contact with the placement surface G, and the front left leg portion 52 floats from the placement surface G.

Specifically, even when any one of the four leg portions stands on the protruding portion of the placement surface G, the apparatus front side floats. Thus, either of the front right leg portion 51 or the front left leg portion 52 floats. The part floating from the placement surface G is not supported by the placement surface G, and hence the frame is distorted. Specifically, even when any one of the four leg portions stands on the protruding portion of the placement surface G, the front frame 40 is distorted.

Figure 7B:
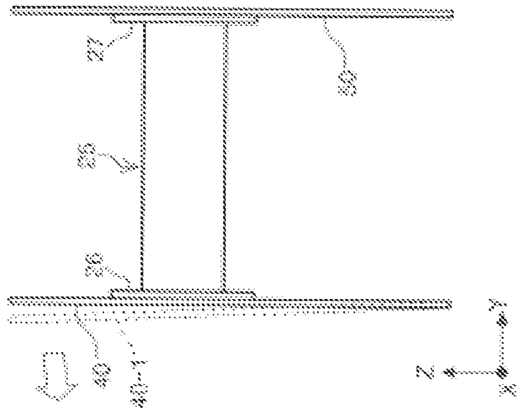
FIGS. 7A and 7B are views schematically illustrating deformation of a front frame.
Figure 7A:
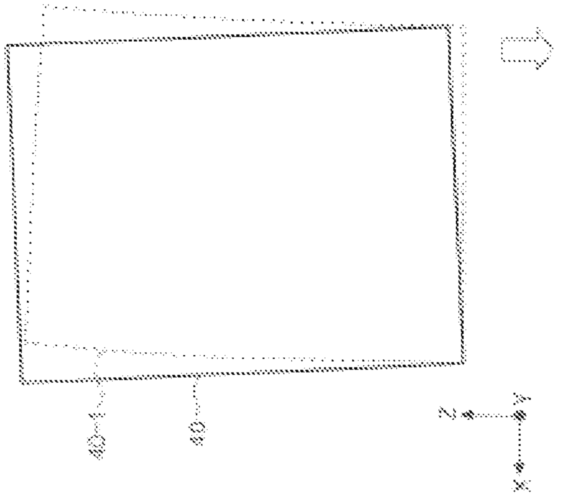

FIGS. 7A and 7B schematically illustrate distortion occurring to the front frame 40 when the front right leg portion 51 floats, and the broken line and the reference symbol 40-1 indicate the front frame 40 that is distorted. When the front right leg portion 51 floats, the front frame 40 is deformed downward as indicated with the arrow in the apparatus front view, as illustrated in FIG. 7A. As illustrated in FIG. 7B, there may be a case in which the front frame 40 is deformed so as to fall frontward as indicated with the arrow in the apparatus side view.

Note that the present exemplary embodiment includes the four leg portions, but is not limited thereto. Five or more leg portions may be provided. In a case in which the apparatus bottom surface is not provided with the leg portion, when the gravity center of the apparatus main body 2 is on the rear side, the apparatus front side floats similarly to the above-mentioned case. Thus, the front frame 40 is distorted.

In view of the above-mentioned problem, in the printer 1, first, the number of components of the motion unit 25 that are supported by the front frame 40 is smaller than the number of components thereof that are supported by the rear frame 41.

Figure 8:
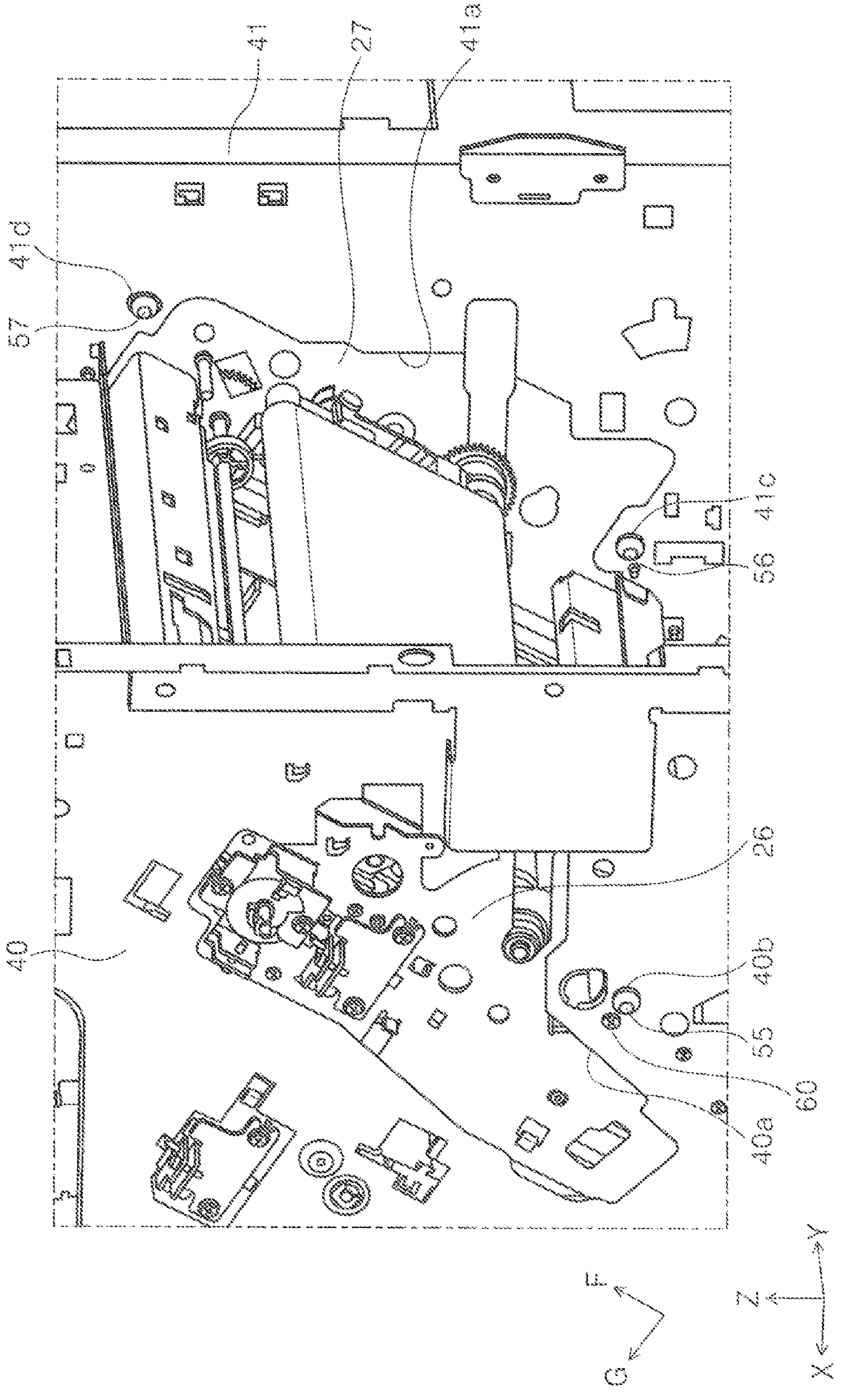
FIG. 8 is a perspective view of the frame structure body in a partially enlarged manner.

Specifically, as illustrated in FIG. 4, FIG. 5, and FIG. 8, the motion unit 25 includes the three supported protrusions including the first supported protrusion 55, the second supported protrusion 56, and the third supported protrusion 57. Those supported protrusions are supported by the front frame 40 and the rear frame 41. Note that, in the following description, when there is no particular need to distinguish the first supported protrusion 55, the second supported protrusion 56, and the third supported protrusion 57 from one another, those protrusions are simply referred to as a supported protrusion in some cases.

Among those three supported protrusions, the first supported protrusion 55 is provided to the first sub frame 26 that faces the front frame 40, and the second supported protrusion 56 and the third supported protrusion 57 are provided to the second sub frame 27 that faces the rear frame 41. Each of the protrusions has a perfect circle shape as viewed in the Y-axis direction (see FIG. 9). Further, each of the protrusions protrudes from the surface of each of the frames from the −Y direction to the −Y direction, and has such a shape that partially maintains a constant outer diameter and is tapered as approaching the −Y direction. Each of the protrusions is formed of a metal material in the present exemplary embodiment.

The first supporting hole 40*b* that the first supported protrusion 55 enters is formed in the front frame 40. The second supporting hole 41*c* that the second supported protrusion 56 enters and the third supporting hole 41*d* that enters the third supported protrusion 57 are formed in the rear frame 41. Note that, in the following description, when there is no particular need to distinguish the first supporting hole 40*b*, the second supporting hole 41*c*, and the third supporting hole 41*d* from one another, those supporting holes are simply referred to as a supporting hole in some cases.

Further, when the first supported protrusion 55 enters the first supporting hole 40*b*, the motion unit 25 is supported on the side close to the front frame 40. Further, when the second supported protrusion 56 enters the second supporting hole 41*c*, and the third supported protrusion 57 enters the third supporting hole 41*d*, the motion unit 25 is supported on the side close to the rear frame 41.

Note that, in the present exemplary embodiment, the third supporting hole 41*d* is formed so as to be an elongated hole in the F-axis direction, and is configured to cancel variation of the distance between the second supported protrusion 56 and the third supported protrusion 57 in the F-axis direction. With this, even when the distance between the second supported protrusion 56 and the third supported protrusion 57 in the F-axis direction varies, the motion unit 25 can be mounted to the rear frame 41 appropriately.

Further, in the present exemplary embodiment, at least clearance fitting specified in JISB0405 or a gap larger than the clearance fitting is secured for fitting between the first supported protrusion 55 and the first supporting hole 40*b* and fitting between the second supported protrusion 56 and the second supporting hole 41*c*. With this, the respective supported protrusions are allowed to move at least within a predetermined range in the Y-axis direction with respect to the respective supporting holes.

Note that, in the present exemplary embodiment, under a state in which the front frame 40 and the rear frame 41 are coupled to each other via the coupling frames other than the motion unit 25, the motion unit 25 is supported by the front frame 40 and the rear frame 41. The motion unit 25 moves in the −Y direction with respect to the front frame 40 and the rear frame 41. With this, the respective supported protrusions can enter the respective supporting holes.

Thus, an opening portion 41*a* that allows the motion unit 25 to pass therethrough from the +Y direction to the −Y direction is formed in the rear frame 41. The second supporting hole 41*c* and the third supporting hole 41*d* are formed in the vicinity of the edge of the opening portion 41*a*. The front frame 40 has an opening portion 40*a* for exposing a part of the motion unit 25 (a part of the first sub frame 26).

Figure 10:
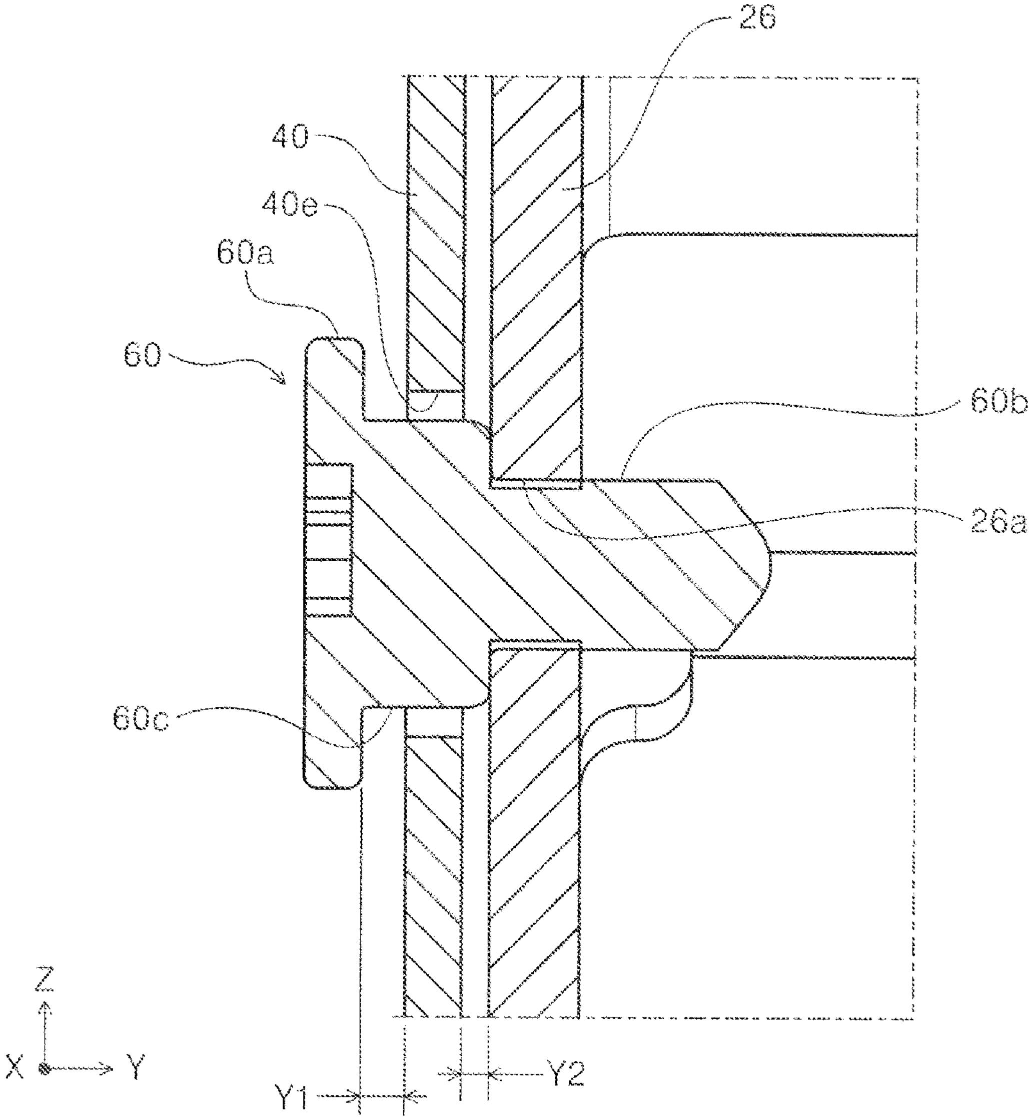
FIG. 10 is a cross-sectional view of a part at which the motion unit and the front frame are coupled.

Further, in the present exemplary embodiment, the motion unit 25 is supported with play in the Y-axis direction. Specifically, as illustrated in FIG. 8 and FIG. 10, the first sub frame 26 of the motion unit 25 is fixed to the front frame 40 in the vicinity of the first supporting hole 40*b* with a stepped screw 60. Note that, in the present exemplary embodiment, the second sub frame 27 of the motion unit 25 is not coupled to the rear frame 41.

However, the second sub frame 27 of the motion unit 25 may be coupled to the rear frame 41 with a screw or the like.

In FIG. 10, the stepped screw 60 has a head portion 60*a*, a screw portion 60*b*, and a cylinder portion 60*c* positioned between the head portion 60*a* and the screw portion 60*b*.

A screw hole 26*a* is formed in the first sub frame 26 of the motion unit 25, and the screw portion 60*b* of the stepped screw 60 is screw-fitted into the screw hole 26*a* of the first sub frame 26. A through hole 40*e* is formed in the front frame 40, and the cylinder portion 60*c* of the stepped screw 60 is inserted into the through hole 40*e*.

The inner diameter of the through hole 40*e* is sufficiently larger than the outer diameter of the cylinder portion 60*c*, and has such a size that does not hinder relative movement between the cylinder portion 60*c* and the front frame 40 in the Y-axis direction.

Further, the length of the cylinder portion 60*c* (the length in the Y-axis direction) is sufficiently larger than the thickness of the front frame 40 (the thickness in the Y-axis direction). In FIG. 10, the reference symbol Y1 indicates play for which the front frame 40 is allowed to move in the −Y direction with respect to the first sub frame 26, and the reference symbol Y2 indicates play for which the front frame 40 is allowed to move in the +Y direction with respect to the first sub frame 26. In the present exemplary embodiment, Y1+Y2 corresponds to secured play.

In this manner, the motion unit 25 is coupled to the front frame 40 with the play in the Y-axis direction.

As described above, the printer 1 includes the motion unit 25 including the head unit 33 (the line head 34), and the front frame 40 and the rear frame 41 being the pair of side plates positioned across the motion unit 25 and supporting the motion unit 25. The gravity center position of the apparatus main body 2 is on a side close to the rear frame 41 with respect to the intermediate position between the front frame 40 and the rear frame 41. With this configuration, distortion is likely to occur in the front frame 40. However, the number of components of the motion unit 25 that are supported by the front frame 40 is smaller than the number of components thereof that are supported by the rear frame 41.

With this, distortion of the front frame 40 is less likely to affect the motion unit 25, and hence distortion of the motion unit 25 can be suppressed. As a result, position shift of the head unit 33 (the line head 34) along with distortion of the front frame 40 can be suppressed. In other words, degradation of recording quality can be suppressed.

Note that the above-mentioned actions and effects obtained by the fact that the number of components of the motion unit 25 that are supported by the front frame 40 is smaller than the number of components thereof that are supported by the rear frame 41 can also be obtained by a configuration in which the motion unit 25 is not fixed to the front frame 40 or the rear frame 41 with a screw or the like.

In the present exemplary embodiment, the pair of side plates is formed of the front frame 40 and the rear frame 41, in other words, the pair of side plates arranged along the Y-axis direction. However, the pair of side plates may be arranged along the X-axis direction.

Further, the motion unit 25 is coupled to the front frame 40 and the rear frame 41 with the play in the Y-axis direction. With this, even when the front frame 40 or the rear frame 41 is distorted, such distortion is less likely to affect the motion unit 25. With this, while the position of the motion unit 25 with respect to the front frame 40 and the rear frame 41 is defined, distortion of the front frame 40 can be prevented from affecting the motion unit 25. Thus, degradation of recording quality can be suppressed.

Note that the above-mentioned actions and effects obtained by the fact that the motion unit 25 is coupled to the front frame 40 and the rear frame 41 with play can be obtained regardless of the number of components of the motion unit 25 that are supported by the front frame 40 and the number of components thereof that are supported by the rear frame 41.

In the present exemplary embodiment, the play is play in a direction in which the front frame 40 is away from the rear frame 41. Thus, distortion of the front frame 40 in a direction in which the front frame 40 is away from the rear frame 41 as illustrated in FIG. 7B is less likely to affect the motion unit 25.

As described with reference to FIG. 10, the motion unit 25 is coupled to the front frame 40 by the stepped screw 60. The stepped screw 60 has the head portion 60*a*, the screw portion 60*b* that is fitted into the screw hole 26*a* of the motion unit 25, and the cylinder portion 60*c* that has a larger diameter than the screw portion 60*b* and is provided between the head portion 60*a* and the screw portion 60*b*. The cylinder portion 60*c* is inserted into the through hole 40*e* formed in the front frame 40. With this, while the play can be secured, the front frame 40 and the motion unit 25 can easily be coupled to each other. Further, the motion unit 25 can be prevented from falling off from the frame structure body 39.

Note that, in the present exemplary embodiment, as described with reference to FIG. 10, play Y1 for allowing the front frame 40 to move the −Y direction with respect to the first sub frame 26 and play Y2 for allowing the front frame 40 to move in the +Y direction with respect to the first sub frame 26 are provided. However, at least the Y1 is only required to be provided.

Note that each of the supported protrusions including the first supported protrusion 55, the second supported protrusion 56, and the third supported protrusion 57, which are described with reference to FIG. 8, has a length at the largest part in the Y-axis direction that is set longer than the dimension of the play in the Y-axis direction. Thus, even when the play allows the motion unit 25 to move in the Y-axis direction with respect to the front frame 40 and the rear frame 41, the play maintains a state in which the respective supported protrusions described above are appropriately supported by the respective supporting portions.

In the present exemplary embodiment, the motion unit 25 is supported at one position being the first supported protrusion 55 being an example of the first supported portion on the front frame 40, and is supported at two positions being the second supported protrusion 56 being an example of the second supported portion and the third supported protrusion 57 being an example of the third supported portion on the rear frame 41. With this, while the motion unit 25 is securely supported by the rear frame 41, distortion of the front frame 40 can securely be prevented from affecting the motion unit 25.

Note that, in the present exemplary embodiment, the motion unit 25 is supported at one position on the front frame 40, and is supported at two positions on the rear frame 41. However, as a matter of course, the present exemplary embodiment is not limited thereto. Specifically, the number of components of the motion unit 25 that are supported by the front frame 40 is only required to be smaller than the number of components thereof that are supported by the rear frame 41.

Figure 9:
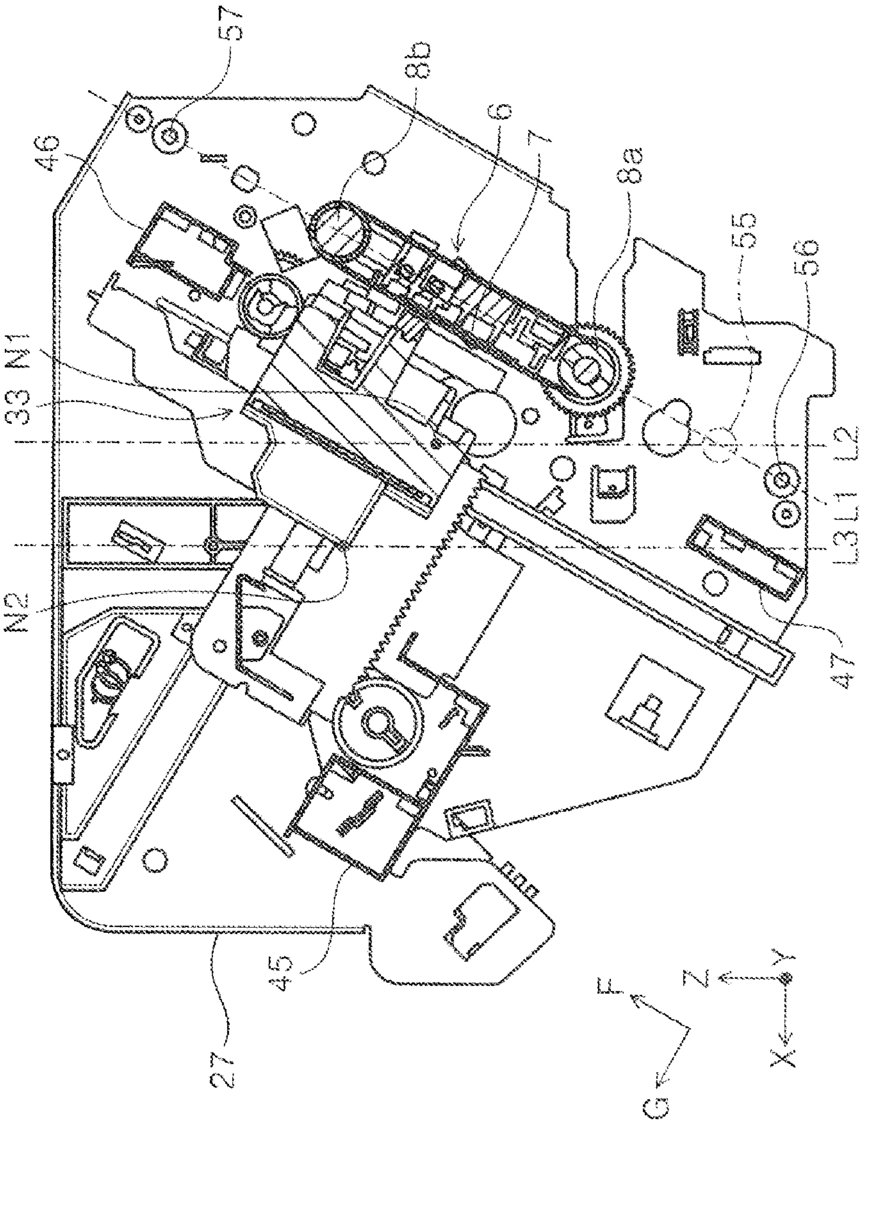
FIG. 9 is a cross-sectional view of the motion unit.

In the present exemplary embodiment, the installation position of each of the supported protrusions is set in view of the following points. First, as illustrated in FIG. 9, when the transport path of the medium is viewed from a side, in other words, in the Y-axis direction, the second supported protrusion 56 and the third supported protrusion 57 are on the extension line of the linear line coupling the rotation center of the pulley **8*a* and the rotation center of the pulley 8*b* so as to sandwich the transport belt 7. In FIG. 9, a linear line L1 is obtained by extending a liner line coupling a rotation center of the pulley 8*a* and a rotation center of the pulley 8*b* to each other. In other words, the second supported protrusion 56 and the third supported protrusion 57** overlap with the linear line L1.

With this, the following actions and effects can be obtained. In other words, when the rear frame 41 is distorted, such distortion has an influence that distorts the motion unit 25 via the second supported protrusion 56 and the third supported protrusion 57. In this case, the farther the motion unit 25 is at a position away from the second supported protrusion 56 and the third supported protrusion 57, the more likely it is the distortion of the motion unit 25 is increased. Thus, there may be a risk that, the farther the transport belt 7 is at a position away from the second supported protrusion 56 and the third supported protrusion 57, the more the position shift of the transport belt 7 along with distortion of the motion unit 25 is increased.

However, in the present exemplary embodiment, as described above, the second supported protrusion 56 and the third supported protrusion 57 are on the extension line of the linear line L1. Thus, position shift of the transport belt 7 along with distortion of the motion unit 25 can be suppressed. With this, when a transport mechanism of the medium is provided to the rear frame 41 and the front frame 40, for example, position shift between the transport mechanism and the transport belt 7 can be suppressed, and hence the medium can be transported appropriately.

Note that, in the present exemplary embodiment, the first medium cassette 3 and the second medium cassette 4, the medium transport paths from the respective cassettes to the transport roller pair 16 and the roller pairs provided to the paths, the medium transport path downstream of the transport roller pair 17, and the roller pairs provided to the path, which are illustrated in FIG. 1, are not provided to the motion unit 25, but to the rear frame 41 and the front frame 40. In other words, the configurations other than the transport belt 7 in the medium transport paths are not provided to the motion unit 25, but to the rear frame 41 and the front frame 40. Therefore, in the present exemplary embodiment, position shift between the transport roller pairs 16 and 17, and the transport belt 7 can particularly be suppressed.

As illustrated in FIG. 9, as viewed in a direction intersecting the front frame 40 and the rear frame 41, in other words, in the Y-axis direction, the first supported protrusion 55 overlaps with a first vertical line L2 passing through a gravity center position N1 of the motion unit 25. With this, an own weight of the motion unit 25 acts linearly along the first vertical line L2 on the first supported protrusion 55. Thus, deformation of the motion unit 25 due to an own weight of the motion unit 25 can be suppressed. Particularly, in the present exemplary embodiment, deformation of the first sub frame 26 including the first supported protrusion 55 can be suppressed.

Note that FIG. 9 is a cross-sectional view of the motion unit 25 that is taken along the X-Z plane and is viewing a side of the second sub frame 27.

Note that, in the present exemplary embodiment, the first supported protrusion 55 overlaps with the vertical line L2. However, at least any one of the plurality of supported protrusions is only required to overlap with the first vertical line L2, or all the supported protrusions may overlap with the first vertical line L2.

As described with reference to FIG. 2, the head unit 33 is displaceable along the G-axis direction in the motion unit 25, and the ink ejection surface 35 is displaced between the position G1 and the position G3. The gravity center position N1 corresponds to a gravity center position of the motion unit 25 when the ink ejection surface 35 is at the position G1 in FIG. 2. In FIG. 9, the reference symbol N2 indicates a gravity center position of the motion unit 25 when the ink ejection surface 35 is at the position G3 in FIG. 2. The reference symbol L3 indicates a second vertical line passing through the gravity center position N2.

With this configuration, in the present exemplary embodiment, the second supported protrusion 56 is positioned between the first vertical line L2 and the second vertical line L3. With this, an own wight of the motion unit 25 acts linearly on the vicinity of the second supported protrusion 56. Thus, deformation of the motion unit 25 due to an own weight of the motion unit 25 can be suppressed.

Note that at least any one of the plurality of supported protrusions is only required to be positioned between the first vertical line L2 and the second vertical line L3. Alternatively, all the supported protrusions may be positioned between the first vertical line L2 and the second vertical line L3.

At least any one of the plurality of supported protrusions may overlap with at least any one of the first vertical line L2 and the second vertical line L3. Alternatively, all the supported protrusions may overlap with at least any one of the first vertical line L2 and the second vertical line L3.

Note that, in FIG. 9, the first supported protrusion 55 may be at a position overlapping with the second supported protrusion 56 or the third supported protrusion 57. In particular, in the present exemplary embodiment, the first supported protrusion 55 may be at a position overlapping with the second supported protrusion 56.

With this, the following actions and effects can be obtained. In other words, when the first supported protrusion 55 is at a position overlapping with the second supported protrusion 56, the motion unit 25 has a structure in which the third supported protrusion 57 receives rotational moment having the first supported protrusion 55 and the second supported protrusion 56 as a rotation center. With this, complex distortion of the motion unit 25, which is caused by an own weight of the motion unit 25, can be suppressed.

The head unit 33 being an example of a recorder includes the line head 34, and the motion unit 25 includes, between the first sub frame 26 and the second sub frame 27, the wiper carriage 36 that performs wiping on the ink ejection surface 35 of the line head 34 and the cap carriage 31 that caps the ink ejection surface 35.

With this, influence of distortion of the front frame 40 and the rear frame 41 being a pair of side plates, which affects a positional relationship between the head unit 33 and the wiper carriage 36 and a positional relationship between the head unit 33 and the cap carriage 31, can be suppressed. As a result, wiping can be performed on the ink ejection surface 35 appropriately, and the ink ejection surface 35 can be capped appropriately.

The present disclosure is not limited to each of the exemplary embodiments described above, and many variations can be made within the scope of the present disclosure as described in the claims. It goes without saying that such variations also fall within the scope of the present disclosure.

What is claimed is:

1. A recording apparatus comprising:
- a recording unit including a recorder configured to perform recording on a medium; and
- a first side plate and a second side plate, wherein
  - both the first side plate and the second side plate are positioned across the recording unit and configured to support the recording unit,
  - an apparatus gravity center position and an intermediate position are between the first side plate and the second side plate,
  - the apparatus gravity center position is closer to the second side plate with respect to the intermediate position,
  - a first number of components of the recording unit is smaller than a second number of components of the recording unit, and
  - the first number of components is supported by the first side plate and the second number of components is supported by the second side plate.

2. The recording apparatus according to claim 1, wherein the recording unit is coupled to the first side plate with play.

3. The recording apparatus according to claim 2, wherein the play is play at least in a direction in which the first side plate is away from the second side plate.

4. The recording apparatus according to claim 3, wherein
- the recording unit is coupled to the first side plate by a stepped screw,
- the stepped screw includes
  - a head portion,
  - a screw portion fitted into a screw hole of the recording unit, and
  - a cylinder portion having a diameter larger than the screw portion, and provided between the head portion and the screw portion, and
  - the cylinder portion is inserted into a through hole formed at the first side plate.

5. The recording apparatus according to claim 1, wherein the recording unit is supported at one position being a first supported portion at the first side plate, and is supported at two positions being a second supported portion and a third supported portion at the second side plate.

6. The recording apparatus according to claim 5, wherein
- the recording unit includes a transport belt arranged at a first position facing the recorder and configured to transport the medium,
- the transport belt is stretched around a first pulley and a second pulley that are arranged along a transport direction of the medium, and
- the second supported portion and the third supported portion are located on an extension line of a linear line coupling a rotation center of the first pulley and a rotation center of the second pulley so as to sandwich the transport belt when a transport path of the medium is viewed from a side.

7. The recording apparatus according to claim 6, wherein the first supported portion is at a second position overlapping the second supported portion or the third supported portion as viewed in a direction intersecting the first side plate and the second side plate.

8. The recording apparatus according to claim 5, wherein at least one of the first supported portion, the second supported portion, and the third supported portion overlaps a vertical line passing through a gravity center position of the recording unit as viewed in a direction intersecting the first side plate and the second side plate.

9. The recording apparatus according to claim 5, wherein
- the recorder is displaceably provided between a first position and a second position in the recording unit, and
- at least one of the first supported portion, the second supported portion, and the third supported portion is positioned between a first vertical line and a second vertical line, or overlap with at least one of the first vertical line and the second vertical line, as viewed in a direction intersecting the first side plate and the second side plate, the first vertical line passing through a gravity center position of the recording unit when the recorder is located at the first position, the second vertical line passing through the gravity center position of the recording unit when the recorder is located at the second position.

10. The recording apparatus according to claim 5, wherein the recording unit includes
- a first sub frame being a frame facing the first side plate and including the first supported portion, and
- a second sub frame being a frame facing the second side plate and including the second supported portion and the third supported portion.

11. The recording apparatus according to claim 10, wherein
- the recorder includes a liquid ejection head configured to eject a liquid, and the recording unit includes, between the first sub frame and the second sub frame, a wiping unit configured to perform wiping on a liquid ejection surface of the liquid ejection head, and a cap unit configured to cap the liquid ejection surface.

12. The recording apparatus according to claim 1, wherein a leg portion is provided at each of four corners of a bottom portion of an apparatus main body.

13. A recording apparatus comprising:

a recording unit including a recorder configured to perform recording on a medium; and a first side plate and a second side plate, wherein both the first side plate and the second side plate are positioned across the recording unit and configured to support the recording unit, an apparatus gravity center position and an intermediate position are between the first side plate and the second side plate, the apparatus gravity center position is closer to the second side plate with respect to the intermediate position, the recording unit is coupled to the first side plate with play.

* * * * *